US012580931B2

(12) United States Patent
Liu et al.

(10) Patent No.: US 12,580,931 B2
(45) Date of Patent: Mar. 17, 2026

(54) SYSTEMS AND METHODS FOR DETECTION AND CORRECTION OF ANOMALOUS NETWORK SYSTEM BEHAVIOR

(71) Applicant: VIASAT, INC., Carlsbad, CA (US)

(72) Inventors: Victor Liu, Ann Arbor, MI (US); Benjamin Lucero, Del Mar, CA (US); Rishabh Tewari, Austin, TX (US)

(73) Assignee: VIASAT INC., Carlsbad, CA (US)

( * ) Notice: Subject to any disclaimer, the term of this patent is extended or adjusted under 35 U.S.C. 154(b) by 312 days.

(21) Appl. No.: 18/120,215

(22) Filed: Mar. 10, 2023

(65) Prior Publication Data

US 2024/0305655 A1 Sep. 12, 2024

(51) Int. Cl.
*H04L 9/40* (2022.01)
*G06N 3/091* (2023.01)
(52) U.S. Cl.
CPC ......... *H04L 63/1425* (2013.01); *G06N 3/091* (2023.01)
(58) Field of Classification Search
CPC ............. H04L 63/1425; H04L 41/0654; H04L 41/0631; H04L 41/0859; H04L 41/0803; H04L 9/40; G06N 3/091
See application file for complete search history.

(56) References Cited

U.S. PATENT DOCUMENTS 10,824,726 B1 * 11/2020 Herman Saffar ..... G06F 21/566
2019/0156184 A1   5/2019 Le et al.

2020/0195501 A1 *  6/2020 Shenoy .............. H04L 41/0894
2020/0374298 A1 * 11/2020 Sirianni ................ H04L 63/145
2022/0066906 A1 *  3/2022 Kumar .................. G06F 11/328
2022/0294715 A1 *  9/2022 Agrawal ............. H04L 63/1408
2023/0007023 A1 *  1/2023 Andrabi ............. H04L 63/1425
2024/0098100 A1 *  3/2024 Lal ....................... H04L 63/1441
2024/0171594 A1 *  5/2024 Garcia ................ H04L 63/1425
2024/0187434 A1 *  6/2024 Shastri .................... H04L 41/16
2024/0195687 A1 *  6/2024 Shrestha ............. H04L 41/0816

FOREIGN PATENT DOCUMENTS

EP      3672157 B1   11/2021

OTHER PUBLICATIONS

Copy of the International Search Report and Written Opinion filed in corresponding PCT Application No. PCT/US2024/018648; mailing date Jun. 26, 2024; 20 Pages.
Mou, Lili et al., "Convolutional Neural Networks over Tree Structures for Programming Language Processing", Proceedings of the Thirtieth AAAI Conference on Artificial Intelligence (AAAI-16), Copyright date 2016, pp. 1287-1293.

* cited by examiner

*Primary Examiner* — Tonia L Dollinger
*Assistant Examiner* — Mehulkumar J Shah
(74) *Attorney, Agent, or Firm* — Vorys, Sater, Seymour and Pease, LLP; Michael Messinger

(57) ABSTRACT

An anomaly prediction tool is employed on a communication network to monitor systems and/or devices on the network for anomalous behaviors. The anomaly prediction tool can include a machine learning (ML) model to detect anomalous network systems operating on the network based on a data tree derived from network configuration data for the network. In some examples, the ML model is a graph-based convolutional neural network.

17 Claims, 8 Drawing Sheets

NETWORK 202

NETWORK SYSTEM 204

NETWORK SYSTEM 204

NETWORK MANAGER 210

200

208

DATA RETRIEVER 212

DATASET GENERATOR 214

MACHINE LEARNING MODEL 216

REMEDIAL ACTIONS 218

SYSTEM CONTROLLER 220

PROCESSOR 206

300

```
{
    "teTunnel": "null",
    "loopbackMode": "false",
    "description": "tor03-esa.lab-et-0/0/2",
    "aggregation": "null",
    "subinterfaces": [
        {
            "switchedVlans": "null",
            "vlan": "null",
            "ipv4": {
                "fhrpAddresses": [
                ]
            }
        }
    ]
}
```

RECEIVING ANOMALOUS SYSTEM
BEHAVIORS AND REMEDIAL ACTIONS
608

RECEIVING NETWORK
CONFIGURATION TRAINING DATA
SETS
602

ORGANIZING NETWORK
CONFIGURATION DATA SETS
604

PREPROCESSING A DATA SET OF
DATA TREES
606

TRAINING A MACHINE LEARNING
MODEL
610

600

700

RECEIVING NETWORK
CONFIGURATION DATA
702

ORGANIZING NETWORK
CONFIGURATION DATA
704

PREPROCESSING DATA INTO A DATA
TREE
706

PREDICTING BEHAVIOR OF
NETWORK SYSTEMS
708

OUTPUTTING ANOMALOUS SYSTEM
BEHAVIOR
710

PERFORMING REMEDIATION ACTION
TO CORRECT ANOMALOUS SYSTEM
BEHAVIOR
712

SYSTEMS AND METHODS FOR DETECTION AND CORRECTION OF ANOMALOUS NETWORK SYSTEM BEHAVIOR

TECHNICAL FIELD

This disclosure relates generally to network system management, and more particularly, to detecting and remediating anomalous network system behavior.

BACKGROUND

Network management is a process of administering and managing networks. Services provided by this discipline include fault analysis, performance management, provisioning of networks and maintaining a quality of service. Network monitoring is the use of a system that constantly monitors a computer network for slow or failing components and that notifies the network administrator (via email, SMS or other alarms) in case of outages or other trouble. Network monitoring is part of network management.

SUMMARY

In embodiments, computer-implemented methods, systems and computer-readable media for detection and correction of anomalous network system behavior using anomaly prediction are described.

In an embodiment, a system can include a processor, and memory storing machine readable instructions executable by the processor. The machine readable instructions can include an anomaly prediction tool that can include a machine learning (ML) model that can detect anomalous network systems operating on a network based on a set of data trees derived from network configuration data for the network with different anomalous behaviors.

In another embodiment, a non-transitory computer-readable medium can store machine readable instructions that when executed by a processor, cause the processor to receive network configuration data for each system on a communication network, generate a data tree based on the network configuration data of each system on the communication network, organize a set of data trees and their anomalous behaviors into a dataset, employ a data preprocessor to identify one or more anomalous behaviors by one or more systems on the communication network based on the data tree, use a ML model to train using the dataset, feed a new data tree from the network configuration data from the network system into the trained ML model to predict the anomalous behavior, and output data indicating which systems of the one or more systems are exhibiting anomalous system behaviors.

In a further embodiment, a computer implemented method can include receiving network configuration data for each system on a network, assembling a data tree based on the network configuration data for the network, predicting, using a ML model, anomalous behavior within the network based on the data tree, and displaying a list of anomalous systems within the network for remediation based on a prediction of the ML model.

Further embodiments, features, and advantages of the invention, as well as the structure and operation of the various embodiments of the invention are described in detail below with reference to accompanying drawings.

BRIEF DESCRIPTION OF THE DRAWINGS

Embodiments are described with reference to the accompanying drawings. In the drawings, like reference numbers can indicate identical or functionally similar elements. The drawing in which an element first appears is generally indicated by the left-most digit in the corresponding reference number.

DETAILED DESCRIPTION

This disclosure relates generally to network system management, and more particularly, to the prediction and remediation of anomalous system behavior using machine learning (ML) techniques. In examples herein a networking monitoring tool (referred to as an anomaly prediction tool) is described that can be used to detect potential anomalous network system behaviors exhibited by one or more network systems on a network. In some examples, the network monitoring tool employs a graph neural network, such as a tree-based convolutional neural network (TB-CNN) model, for the evaluation of a generated data tree to identify potential anomalous behaviors of network systems on the network. In some examples, the potential anomalous behaviors represent a loss of connectivity, or reachability, between a network system and the network. The potential anomalous behaviors can be limited and affect one to several connections, or can be large-scale and affect millions to billions of connections simultaneously. In some examples, the networking monitoring tool can quickly detect these anomalous behaviors and feed network configuration data to train the ML models, and eventually use the trained ML models for future anomalous behavior prediction. In some examples, the potential anomalous behaviors can be errors tied to the border gateway protocol (BGP) neighbor establishment status between two BGP routers. When the BGP neighbor establishment status is reverted from the normal established status, it can reflect a transition state impacted by a lower layer network change and can impact the end-to-end connection if not corrected by any redundancy built inside the network. As different potential anomalous behaviors can have different root causes, in some examples the network monitoring tool can detect the differences between the root causes as well as the impact of each root cause.

Communication networks require constant monitoring for detection and remediation of anomalous system behavior (e.g., caused by an outside intruder (e.g., a hacker), malware, other types of cyber security threats, aging software/hardware, or potential errors due to the constant changes in the configuration and topology of the network to handle new requirements and varying circumstances), which can result in costly downtime, system errors, loss of data, or system compromise. By using the anomaly prediction tool as described herein, a communication network can be monitored for anomalies and corrective actions can be taken to mitigate such threats autonomously. As such, the anomaly prediction tool as described herein can reduce operating costs of the network, eliminate or reduce an amount of time needed for human anomaly behavior correction (e.g., identifying an anomalous system, correcting a behavior of the system, etc.), and communication network downtime as threats can be mitigated without human intervention.

Communication System with Anomaly Prediction Tool

Figure 1:
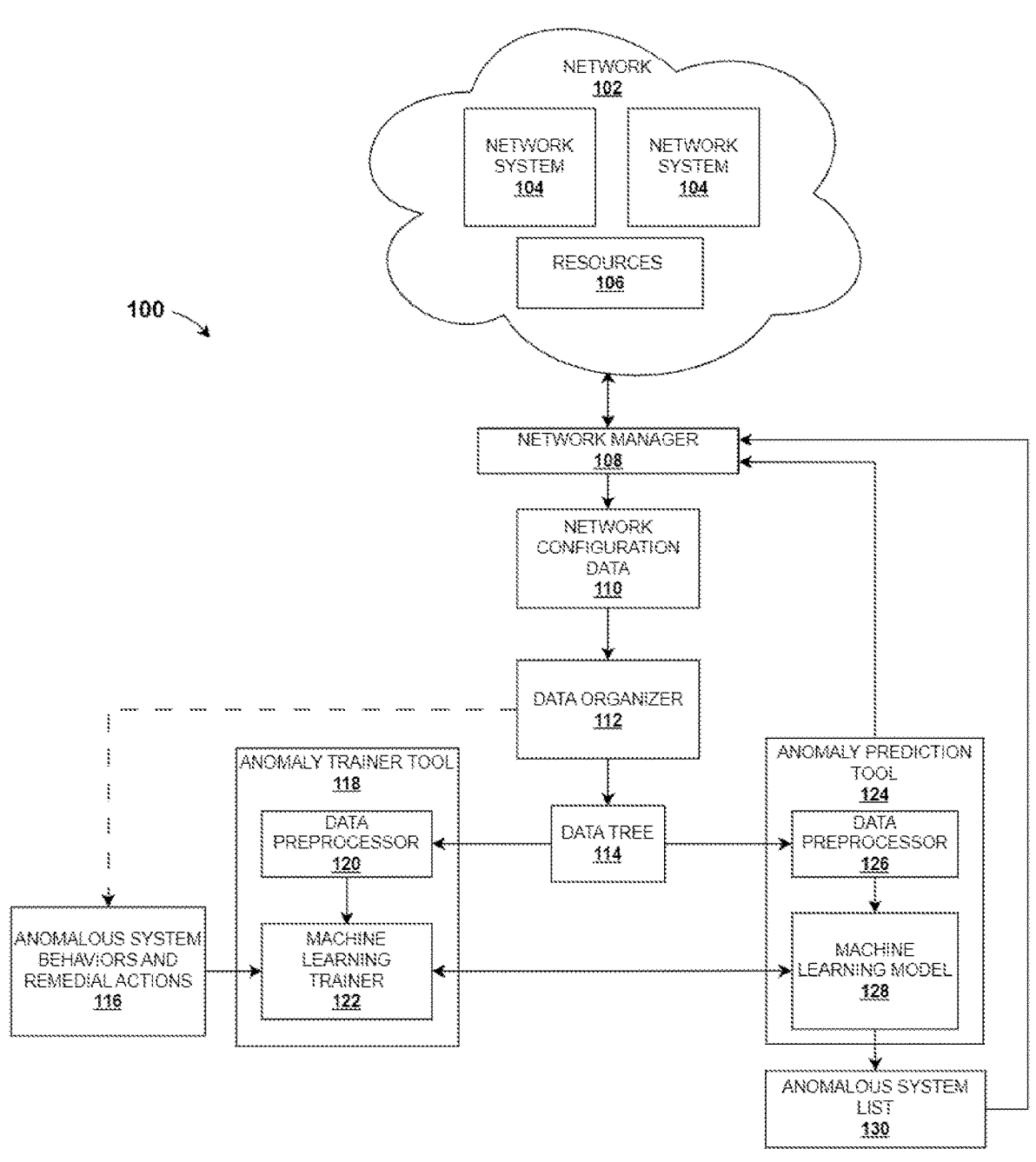
FIG. 1 is an example of a communication system.

FIG. 1 is an example of a communication system 100 in which an anomaly prediction tool 124 is employed or implemented for detecting potential anomalous network systems 104 on a communication network 102. The system 100 can include an N number of network systems 104, wherein N is an integer value greater or equal to one (1). While the example of FIG. 1 illustrates two (2) network systems as part of the network 102, in other examples, the network 102 can include any number of network systems. The network systems 104 can include a combination of computing devices, such as a laptop, a desktop computer, a portable computer, a mobile phone, a tablet, a personal digital assistant (PDA), or any other type of computing or network device (e.g., a switch, a router, a gateway, etc.). In additional or alternative examples, at least some of the network systems 104 can be satellites and their terrestrial networks. Regardless of the type of network system 104 that is employed or implemented on the network 102, the anomaly prediction tool 124 can autonomously detect and correct anomalous system behaviors through the implementation of ML techniques according to the examples described herein. Moreover, while examples are presented herein in which the communication network 102 is a computer network, in other examples, the communication network 102 can include any type of network (or combination of networks) over which data can be communicated. While the example of FIG. 1 illustrates the network systems 104 as part of the network 102, in other examples, the network systems 104 can be coupled to the network and thus employ the network to communicate (e.g., with other systems, devices, etc.).

In some examples, the communication network 102 can include various types of communication networks. For example, the communication network 102 can include local area networks (LANs), wide area networks (WANs), access networks, metro networks, regional networks, global networks, satellite networks, or the like, as well as various combinations thereof. For example, the communication network 102 can include wireline networks (e.g., digital subscriber line (DSL) networks, cable networks, optical networks, or the like), wireless networks (e.g., Third-Generation (3G) cellular networks, Fourth-Generation (4G) cellular networks, Fifth-Generation (5G) cellular networks, advanced cellular networks, WiFi networks, satellite networks, or the like), and/or the like, as well as various combinations thereof. For example, the communication network 102 can include datacenter networks, enterprise networks, factory networks, and/or the like, as well as various combinations thereof. It will be appreciated that various combinations of such example networks can be used to provide the communication network 102. In some examples, the communication network 102 can support intent-based networking, for example, as described herein.

The communication network 102 can include resources 106 that can be configured to support network communications. The resources 106 can represent various types of resources of the communication network 102, including resources of the communication network 102, including physical resources (e.g., devices, computers, processors, memories, servers, switches, or the like), virtual resources (e.g., virtualized network functions (VNFs), virtual machines (VMs), virtual containers (VCs), or the like), or the like, as well as various combinations thereof. In some instances, the resources 106 can represent various types of infrastructure of the communication network 102, for example, including a physical infrastructure (e.g., network elements, devices, systems, or the like), a virtual infrastructure (e.g., virtualized network elements, VNFs, or the like), and/or the like, as well as various combinations thereof. The resources 106 can in some instances include various types of elements of the communication network 102, such as physical elements, virtual elements, or the like, as well as various combinations thereof. For example, the elements can include network elements, such as access points, routers, switches, hubs, network functions (e.g., physical network functions, VNFs, or the like), or the like, as well as various combinations thereof. For example, the elements can include processing elements, such as physical servers or elements, virtual servers or elements, and/or the like, as well as various combinations thereof. In additional or alternative examples, the resources 106 of the communication network 102 can include various other types of resources which can be deployed as part of the communication network 102. In some examples, one or more resources of the resources 106 or a network manager 108 can be used for implementing the anomaly prediction tool 124, as shown in FIG. 1.

In some examples, the system 100 includes a network manager 108 that can be configured to support intent-based networking (IBN). The network manager 108 can be implemented as software (e.g., machine readable instructions that can be executed on a device, for example, as described herein), hardware, and/or a combination thereof. For example, the communication network 102, the network systems 104, and the network manager 108 can be configured to support various aspects of IBN. The network manager 108 can be coupled to network 102 and thus communicate with one or more of network systems 104 and resources 106.

In general, IBN can be configured to support management of a network based on intents defining what the network is to accomplish. IBN can be configured to provide automated control of a communication network (e.g., the communication network 102) to satisfy business intents by translating the business intents into policies that can be applied within the communication network. IBN can be configured to provide network administrators the ability to define what the administrators want the network to do and to provide an automated network management platform to create the desired state and enforce policies, thereby providing the network administrators more control over the network (e.g., network administrators can send a request to tell the network what outcome they want, e.g., their intent, instead of needing to determine and execute individual tasks manually in order to achieve the desired outcome). IBN can be configured to enable a network administrator to configure a network to address and support a business case as opposed to having to perform the individual configuration tasks to achieve the business case (e.g., if the administrator knows what they want the network to accomplish, the network can figure out how to accomplish it while adhering to previously deployed policies and, further, can continuously perform self-checks as the network changes to ensure that the network is continuing to operate as expected to support the business case). IBN can also be configured to automate time-consuming tasks and provide real-time visibility into the state of the network to validate a given intent, predict potential deviations to the intent, and prescribe the action required to ensure that intent. IBN can be configured to enable the network to self-monitor and self-correct, thereby ensuring that intents are satisfied and continue to be satisfied. IBN can be configured to provide networking-as-a-service (NaaS), such as by providing lifecycle management software for networking infrastructure that bridges the gap between business and information technology (IT). In some instances, IBN can be configured to apply a deeper level of intelligence and intended state insights to networking, enabling handling of the insights in a manner that replaces manual processes of configuring networks and reacting to network issues, and, thus, making the network faster, more agile, and less error-prone. IBN can be configured to support various other features, functions, advantages, or the like, as well as various combinations thereof. Thus, in some instances, the system 100 can be configured to support such functions in order to support IBN.

By way of further example, IBN can support various functions to support management of the network 102 based on intents defining what the network is to accomplish. For example, the network manager 108 can support IBN by supporting IBN functions such as intent translation and validation functions, automated implementation functions, network state awareness functions, assurance functions, or the like, as well as various combinations thereof. For example, the network manager 108 can support various intent translation and validation functions. The network manager 108 can take higher-level business policies (what) as input from end users, translate the higher-level business policies (what) into the necessary network configuration (how) capable of providing the higher-level business policies (what), and validate the integrity of the resulting network configuration (how). The network manager 108 can verify that the higher-level business policies can be supported in the network 102 before implementing the higher-level business policies in the network 102. In additional examples, the network manager 108 can support various other intent translation and validation functions.

As an example, the network manager 108 can support various automated implementation functions. For example, the network manager 108 can configure (or cause to be configured) appropriate network configuration (how) across the existing network infrastructure (e.g., using manipulation of network resources to create a desired state of the network 102 that is based on the higher-level business policies (what)). This can be done using network orchestration, network automation, or the like, as well as various combinations thereof. In additional or alternative examples, the network manager 108 can support various other automated implementation functions.

As a further example, the network manager 108 can support various network state awareness functions. For example, the network manager 108 can gather data from the network 102 to constantly monitor the state of the network 102. The network manager 108 can continuously monitor the state of the network 102 for satisfaction of intents (e.g., initial satisfaction at the time of provisioning, continued satisfaction over time through network changes, or the like, as well as various combinations thereof), compliance with policies, identification of problems or potential problems, identification of security threats or potential security threats, or the like, as well as various combinations thereof. In additional or alternative examples, the network manager 108 can support various other network state awareness functions.

In another example, the network manager 108 can support various assurance functions. The network manager 108 can constantly ensure that the desired state of the network 102 is maintained (e.g., based on use of ML to choose the best way to implement the desired state and to take automated corrective action to maintain the desired state). For example, the network manager 108 can continuously (e.g., in real time) verify that the original business intent of the network 102 is being met and, if it is no longer being met or is still being met but may not continue to be met (e.g., based on a prediction that it may not continue to be met), can take preventive or corrective actions (e.g., providing notifications, performing network reconfiguration actions, modifying network capacity, rerouting or blocking traffic, or the like). In additional or alternative examples, the network manager 108 can support various other assurance functions. In additional or other examples, the network manager 108 can be configured to support various other IBN functions. For example, IBN can utilize various technologies and capabilities to support management of a network based on intents defining what the network is to accomplish. For example, the network manager 108 can support IBN by supporting various technologies and capabilities, e.g., network orchestration (NO), artificial intelligence (AI) such as ML, or the like, as well as various combinations thereof.

For example, the network manager 108 can utilize NO functions to support various IBN functions. NO tools can be configured to use automation to provide network services on networking devices. For example, an NO controller (which also may be referred to as a network orchestrator) can support the implementation of various services (e.g., Layer 2 (L2) and Layer 3 (L3) VPNs, Border Gateway Protocol (BGP) peering, access control lists (ACLs) on hardware devices, virtual appliances, Software Defined Networking (SDN) controllers, or the like, as well as various combinations thereof) using various architectures, interfaces, and protocols (e.g., Representational State Transfer (REST) application programming interface (API), Command Line Interface (CLI) via secure shell protocol (SSH), Simple Network Management Protocol (SNMP), Network Configuration Protocol (NETCONF), or the like, as well as various combinations thereof) in order to support configuration of the network to implement and maintain intents. In additional or alternative examples, the network manager 108 can utilize various other NO functions to support various IBN functions.

For example, the network manager 108 can utilize AI, including ML, to enhance various IBN functions with additional knowledge accumulation capabilities. ML can learn from IBN on its ability to prescribe and perform routine tasks, set policies, respond to system events, and verify that goals and actions have been achieved. For example, observed by ML, IBN can make servers reachable from specific networks, if that is what is required to achieve a given intent. Thus, the network manager 108 can use ML to learn how to configure network changes, as well as verify that they are being performed, and it can make adjustments as necessary. ML can also augment IBN with the ability to analyze data, extract information from data, and learn from the extracted data automatically, without being explicitly programmed, and ML can also augment various other IBN functions. In additional or alternative examples, the network manager 108 can utilize various other ML models to support various IBN functions while still decoupling them.

In some examples, the anomaly prediction tool 124 can provide or submit a query request to the network manager 108 to retrieve or receive relevant network configuration data 110 for the network 102. The network configuration data 110 can include a network snapshot that can include state data and/or configuration data for each network system 104. The configuration data can include a network system type (e.g., a device type), a network system name, protocols used by the network system, and any other data that can be externally or internally altered to control network system functionality. The state data can include network system operating conditions, active connections, and any other relevant data that can be generated by network system 104 during operation. In some examples, the state data can include reachability intent data that indicates if a network end point can reach another desired end point. In some examples, the state data includes BGP peering state data, which can serve as both an output state of a successful BGP protocol negotiation as well as the building block for further end-to-end connectivity establishments. Through the collection and querying of the configuration and/or state data, an intended operation and active status of each network system 104 can be collected and provided as the network configuration data 110. The network configuration data 110 can be collected as one or more network snapshots of the network 102, which can employ IBN software, which can be implemented at the network manager 108. In other examples, the network manager 108 can periodically (e.g., every day, month, or at defined period of time) provide the network configuration 110, for example, to a data organizer 112, and/or to the anomaly prediction tool 124.

In some examples, the network configuration data 110 can be organized into a data structure, such as a data tree 114, as shown in the example of FIG. 1. For example, the system 100 can include a data organizer 112 that can process the network configuration data 110 to generate a data tree structure, e.g., the data tree 114. The data tree 114 can represent hierarchical information for network systems 104 which rely upon parent network systems, such as a media access control (MAC) address, IP address, netmask, etc., which can only exist in the scope of a parent network system. In some examples, the data organizer 112 can be implemented as part of the anomaly prediction tool 124. The data organizer 112 can be implemented as machine-readable instructions (e.g., for execution on a device, for example, a network system 104, or a different device (e.g., one or more resources of the resources 106, as described herein)), as hardware, and/or a combination thereof.

In some examples, the data tree 114 can be provided to an anomaly trainer tool 118 for training a ML model 128 of the anomaly prediction tool 124. For example, the network manager 108 can provide the network configuration data 110 that can be used for training the ML model 128 and this data can be referred to herein as network configuration training data. During a ML training phase, the network configuration training data can be processed by the data organizer 112 to provide the data tree 114, which can be referred to as training data tree. Following training of the ML model 128 (based on the training data tree), the network configuration data 110 provided by the network manager 108 can be processed by the data organizer 112 to provide the data tree 114, which can then be provided to the anomaly prediction tool 124 for anomaly detection/prediction according to the examples described herein.

The anomaly trainer tool 118 can be implemented on a computing device (e.g., as described herein), in some instances, on one or more network systems 104. The anomaly trainer tool 118 can receive the data tree 114 (generated based on the network configuration training data) and employ a data preprocessor 120 to perform preprocessing techniques to condition the data tree 114 for training. In some examples, referred to herein as a given example, the network configuration data 110 can be received by the data preprocessor 120 in a JavaScript object notation (JSON)

format to generate the digitalized encoding of the data tree 114. Thus, in the given example, the network configuration data 110 can be provided encoded in a digital format in the data preprocessor 120 and fed to the anomaly trainer tool 118. In some examples, the data preprocessor 120 can use a word-embedding technique to convert the node styles and values to the digital format used by the anomaly trainer tool 118.

In some examples, the anomaly trainer tool 118 can receive one or more anomalous system behaviors and remedial actions 116 that can be determined from the network configuration data 110 (e.g., collected during or prior to training of a ML model 128, as shown in FIG. 1). In some examples, the one or more anomalous system behaviors can be represent when at least one reachability intent cannot be met within the network 102. In some examples, the remediation actions can be to roll the network configuration back to a previously stored state in which no anomalous system behaviors were detected. In some examples, the remediation actions can identify the failed reachability intent, derive a root cause in the configuration, and repair the part of configuration to fix the identified root cause. For training purposes, the anomalous system behaviors and remedial actions 116 can be determined manually prior to being received by the data organizer 112, to identify and flag each or a subset of network systems 104 as anomalous and requiring remediation. In some instances, the anomalous system behaviors and remedial actions 116 can also identify network system behaviors, whether these behaviors are anomalous or not, a type of network system, and remediation information or instructions for mitigating an anomalous network system behavior. In some examples, an anomalous network system behavior can correspond to a functionality of a network system (e.g., device) that has deviated from normal (or desired) network system functionality. In some examples, the anomalous system behaviors and remedial actions 116 can be binary inputs labeling each or a subset of one or more network systems as anomalously or normally operating, or can be multiple values for multi-class classifications which can include a specific anomalous operating condition and a corresponding remediation action identifier. The anomaly trainer tool 118 can train the ML model 128 based on the anomalous system behaviors and remedial actions 116 and the data tree 114.

The anomaly trainer tool 118 can include a ML trainer 122 (e.g., a ML training algorithm) that can be used to provide a trained ML model (corresponding to the ML model 128, as shown in FIG. 1). In one example, the ML model 128 is a TB-CNN. While examples are described in which a CNN is used that is implemented for processing data in tree structure form, in other examples, a different type of ML model (e.g., a type of graph convolution neural network (GCN)) can be configured to process the tree structured data. The ML trainer 122 can receive the plurality of data points with each holding the format of a data tree 114 as the input dataset and can parse and learn the features that can lead to the anomalous system behaviors and remedial actions 116 provided to the anomaly trainer tool 118. The ML trainer 122 can process the data trees 114 for their hierarchical relationships between parent nodes and child nodes in the same data tree 114 and the peer-to-peer dimensionality of the different child nodes sharing the same parent node on the tree to analyze the network 102 (e.g., one or more network systems 104) during training of the ML model 128. The combination of multiple child nodes under the same parent node in the data tree 114 can collaboratively form extensions to support the definition of the parent node. The hierarchical relationships between parent-child nodes, and the peering relationships among child nodes under the same parent, can accurately capture the data dimensions in the data tree 114. The ML trainer 122, and the anomaly trainer tool 118 as a whole, can be trained on a large number of data trees 114 and anomalous system behaviors and remedial actions 116, such that validation cases produce a trained model (corresponding to the ML model 128) that can meet a given accuracy goal. In some examples, the anomaly trainer tool 118, or the ML trainer 122, can employ a portion of the input dataset for verification of the ML model 128. In these examples, the anomaly trainer tool 118, or the ML trainer 122, can generate performance measures for the ML model 128 based upon a comparison between an output of the ML model 128 and the known desired output for the portion of the input dataset used for verification.

In some examples, the data tree 114 can be received by the anomaly prediction tool 124. In some instances, a portion of the network configuration data 110 that was not used for training can be used to provide the data tree 114. In other implementations, the network configuration data 110 provided by the network manager 108 after training of the ML model 128 can be used to provide the data tree 114. The anomaly prediction tool 124 can preprocess the input data tree 114 with the data preprocessor 126, similar to the data preprocessor 120 of the anomaly trainer tool 118. In some examples, the anomaly trainer tool 118 and the anomaly prediction tool 124 can share one or more modules, such as one of the data preprocessors 120 and 126. The data preprocessor 126 can receive the data tree 114 and can perform preprocessing techniques to condition the data for analysis and prediction downstream by the ML model 128. In some examples, the network configuration data 110 can be directly provided to the data preprocessor 126, such that the anomaly prediction tool 124 can utilize the data preprocessor 126 to generate the data tree 114 internally. In examples in which the network configuration data 110 is provided directly to the data preprocessor 126, the data organizer 112 can be omitted. Alternatively, the data preprocessor 126 can reformat or parse the data tree 114 into a preferable format for the prediction process.

With the formatted and preprocessed data, the anomaly prediction tool 124 can receive or utilize the ML model 128 that has been trained or produced by the ML trainer 122, as described herein. The ML model 128 can receive the data tree 114 (after being preprocessed) as an input to determine or identify anomalous behavior conditions or states of the network system 104. The ML model 128 can utilize previously trained datasets as a basis for the determination of patterns and variable interplay that can predict anomalous system behavior.

The ML model 128 can parse through the data tree 114 and identify each or a subset of network systems 104 as anomalous or operating normally. The ML model 128 can output an anomalous system list 130 that can include one or more system identifiers, such as a device name or a pair of IP addresses, and one or more anomalous behaviors of each or a subset of network systems 104. In some examples, the anomalous system list 130 can also identify remediation actions to be taken for correcting anomalous network system behavior of an identified network system by the ML model 128. In some instances, labels can be generated by the ML model 128 that can identify anomalous operation conditions and a corresponding remedial action identifier for mitigating an anomalous operating condition. The anomalous system list 130 can be output to a user device or rendered on a display (e.g., as described herein) for verification.

In further examples, the anomaly prediction tool 124 can provide the anomalous system list 130 with a set of instructions (e.g., commands and/or actions) for remediating anomalous system behaviors of network systems 104 identified by the ML model 128. As such, the network manager 108 can perform one or more remedial actions that have been determined from the network configuration data 110 by the anomaly prediction tool 124 based on the anomalous system list 130. In some examples, the remedial actions can be provided as signals or instructions to the network 102 as a whole, as an individual command to the network system 104 that has been determined as anomalous, or as a command to one or more communicatively coupled neighbors of the network system 104 which can modify the configuration of the network system 104. In some examples, the network manager 108 can receive feedback in the form of state data from the network system 104 that has been identified or flagged as anomalous following implementation of a remedial action for the network system 104. Depending upon the state data, the remedial action can be considered successful or unsuccessful, which can then be provided from the network manager 108 to the anomaly prediction tool 124. With the feedback of the success or failure of the remedial action, the ML model 128 can be updated (e.g., by the anomaly prediction tool 124), such that future predictions can be made at a greater prediction certainty.

Communication networks, such as the network 102, require constant monitoring for the detection and remediation of anomalous behavior (e.g., caused by an outside intruder (e.g., a hacker), malware, other types of cyber security threats) which can result in costly downtime, system errors, loss of data, or system compromise. By using the anomaly prediction tool 124, the communication network 102 can be monitored for anomalies and corrective actions can be taken to mitigate such threats autonomously (e.g., without human intervention). Because the anomaly prediction tool 124 employs a TB-CNN anomalous behavior conditions of network systems 104 of the network 102 can be identified and resolved (e.g., mitigated) at higher or greater accuracy rate (e.g., in contrast to existing techniques) from network snapshots (e.g., the network configuration data 110) of the network 102. As such, the anomaly prediction tool 124 reduces operating costs of the network 102, eliminates or reduces an amount of time needed for human anomaly behavior correction (e.g., identifying an anomalous system, correcting a behavior of the system, etc.), and communication network downtime as threats can be mitigated autonomously.

Mitigation Device

Figure 2:
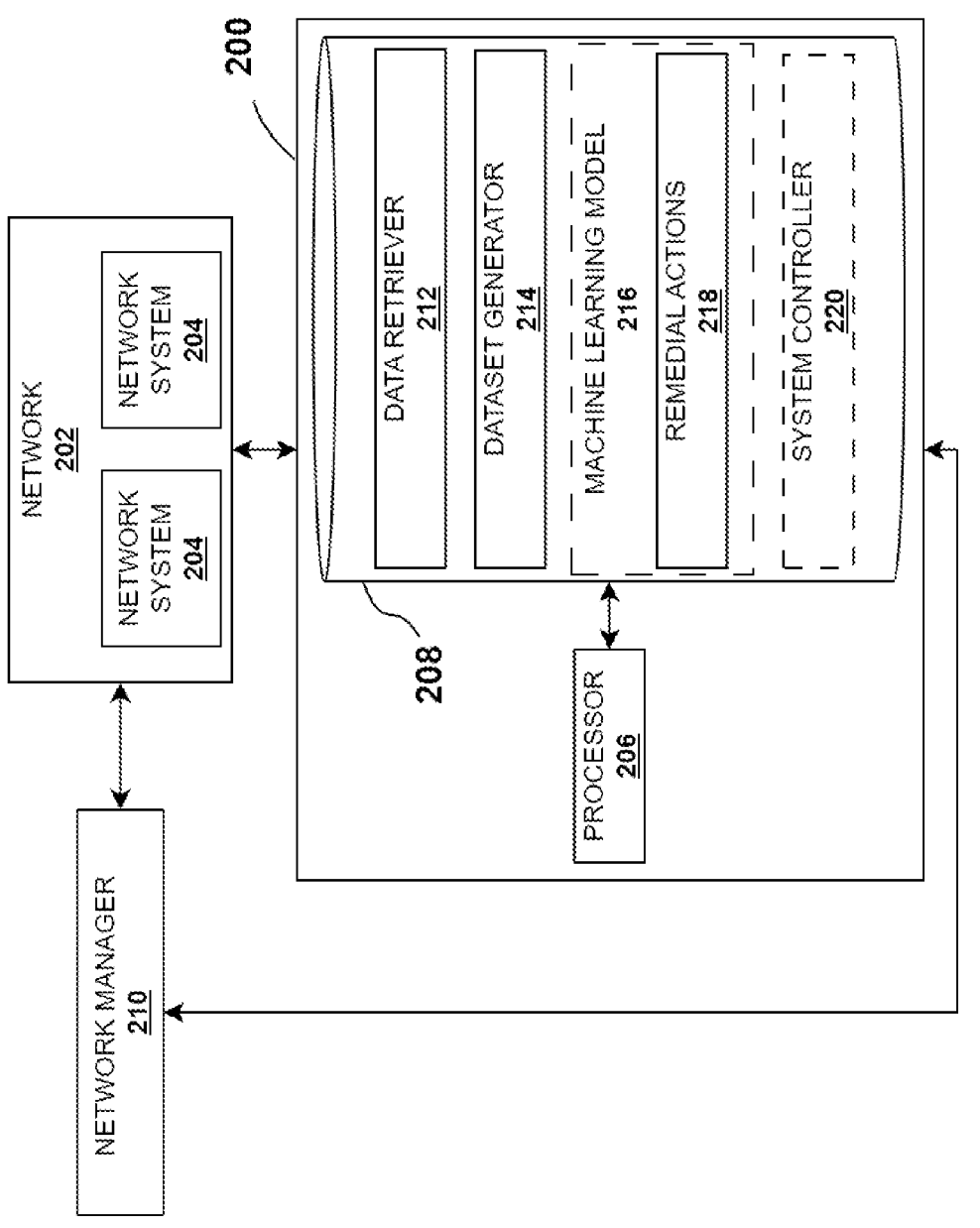
FIG. 2 is an example of a device for mitigating anomalous network system conditions.

FIG. 2 is an example of a device 200 that can be configured to mitigate anomalous network system conditions. The device 200 can be coupled to a network 202 to which a plurality of network systems 204 can be coupled as well. A network manager 210 can be coupled to the network 202 and communicate with the device 200 (e.g., using the network 202, in some instances). In some examples, the network 202 is the network 102, the network manager 210 is the network manager 108, and the network systems 204 are the network systems 104, as shown in FIG. 1. Thus, reference can be made to the example of FIG. 1 in the example of FIG. 2.

The device 200 can include a processor 206 and a memory 208 for storing machine readable instructions that can be executed by the processor 206 to implement anomalous network system detection and mitigation. The memory 208 can represent a non-transitory machine-readable memory (or other medium), such as random access memory (RAM), a solid state drive, a hard disk drive, or a combination thereof. The one or more processors 206 can be implemented as one or more processor cores. In some examples, the one or more modules, shown in block form in FIG. 2, could be implemented in a computing cloud and on one or more servers including a server farm or cluster of servers. In such a situation, features of the device 200, such as the processor 206 and the memory 208 could be representative of a single instance of hardware or multiple instances of hardware with applications executing across the multiple instances (e.g., distributed) of hardware (e.g., computers, routers, memory, processors, or a combination thereof). Alternatively, the features of the device 200 could be implemented on a single dedicated server or workstation. While examples are described herein in which the device 200 implements anomalous network system detection and mitigation techniques, in other examples, the network manager 210 can be configured to implement these functions, and thus device 200 can be omitted.

In some examples, the memory 208 includes a data retriever 212 that can cause the processor 206 to retrieve or send a request to the network manager 210 for the network configuration data 110 (e.g., the state and/or configuration data) for each network system 204 (or a subset thereof). The memory 208 can include a dataset generator 214 that can cause the processor 206 to preprocess and format the network configuration data 110 to generate the data tree 114, as shown in FIG. 1. For example, the dataset generator 214 can generate the data tree 114 and preprocess the data tree 114 to be used by the ML trainer 122 and/or the ML model 128, as shown in FIG. 1 according to the examples described herein. Thus, in some examples, the dataset generator 214 can include a functionality of the data preprocessor 120, the data preprocessor 126, and/or the data organizer 112, as shown in FIG. 1.

In some examples, the memory 208 can include a ML model 216 that can be implemented as a TB-CNN. In some examples, the ML model 216 can be trained by the ML trainer 122 in a same or similar manner as the ML model 128. The ML model 216 can identify potential network systems 204 that can exhibit anomalous behavior conditions, as well identify or determine remedial actions 218 for mitigating or correcting such conditions. The ML model 216 can receive data generated by the dataset generator 214, and can generate one or more labels, and/or classifications, which can identify an anomalous system and a corresponding remedial action to be taken. In some examples, the memory 208 includes a system controller 220 that can cause the processor 206 to mitigate an anomalous network system behavior, for example, in a same or similar manner, as described herein. In some examples, the device 200 provides the remedial actions 218 to the network manager 210, so that the network manager 210 can take remedial actions to mitigate (e.g., reduce or eliminate) the anomalous network system behavior.

Accordingly, by coupling or employing the device 200 on the network 202, anomaly prediction and remediation for network systems (e.g., devices) can be implemented autonomously through the use of the ML model 216. Thus, the device 200 can be used to autonomously monitor the network 202 based on network management data so that human intervention can be reduced or eliminated. Furthermore, because the device 200 employs a TB-CNN as the ML model 216, the hierarchical nature of data relationships within the TB-CNN can enable extraction of hidden data not found in the traditional linear relationships found by existing non-tree based CNNs. The extraction of additional hidden data and relationships can produce higher confidence models and allow for more accurate detection of network systems exhibiting anomalous system behaviors that would not have been detected by a non-tree based CNN.

Network Configuration Data

Figure 3:
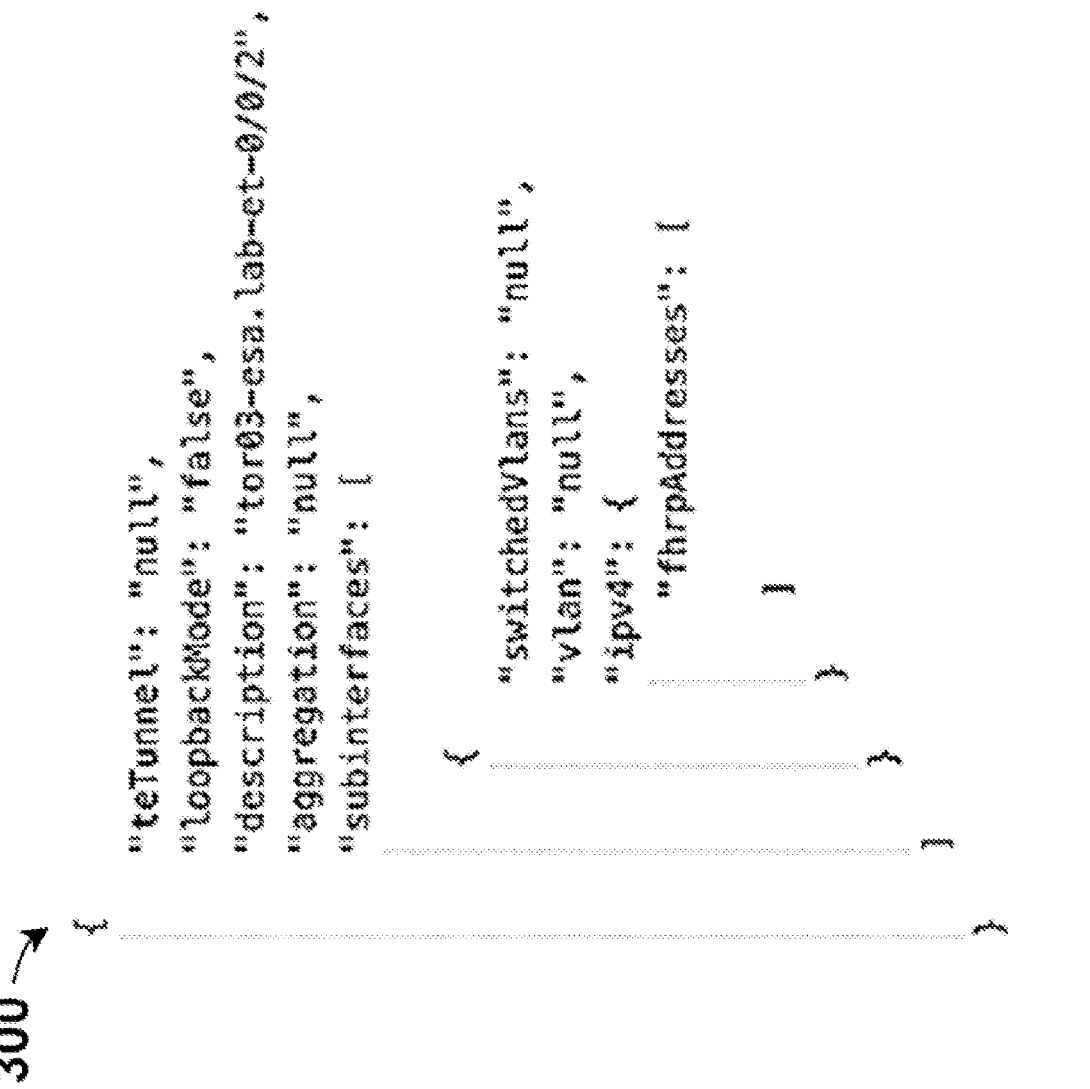
FIG. 3 is an example of a portion of network configuration data.

FIG. 3 is an example of a portion of network configuration data 300. The network configuration data 300 can correspond to the network configuration data 110, as shown in FIG. 1. Thus, reference can be made to the example of FIGS. 1-2 in the example of FIG. 3. The network configuration data 300 can be generated through the querying of a network manager (e.g., the network manager 108, as shown in FIG. 1, or the network manager 210, as shown in FIG. 2) in communication with a network (e.g., the network 102, as shown in FIG. 1, or the network 202, as shown in FIG. 2). In some examples, the network manager can employ IBN software to provide the network configuration data 300, which can include state and configuration data for each network system (e.g., the network systems 104, as shown in FIG. 1, or the network systems 204, as shown in FIG. 2). The network configuration data 300 can include relational information including connections between network systems and network privileges of each network system, such that the interconnection and hierarchical relationships of the network systems can be established. This relational information can be utilized in the construction of a data tree (e.g., the data tree 108, as shown in FIG. 1)

Figure 4:
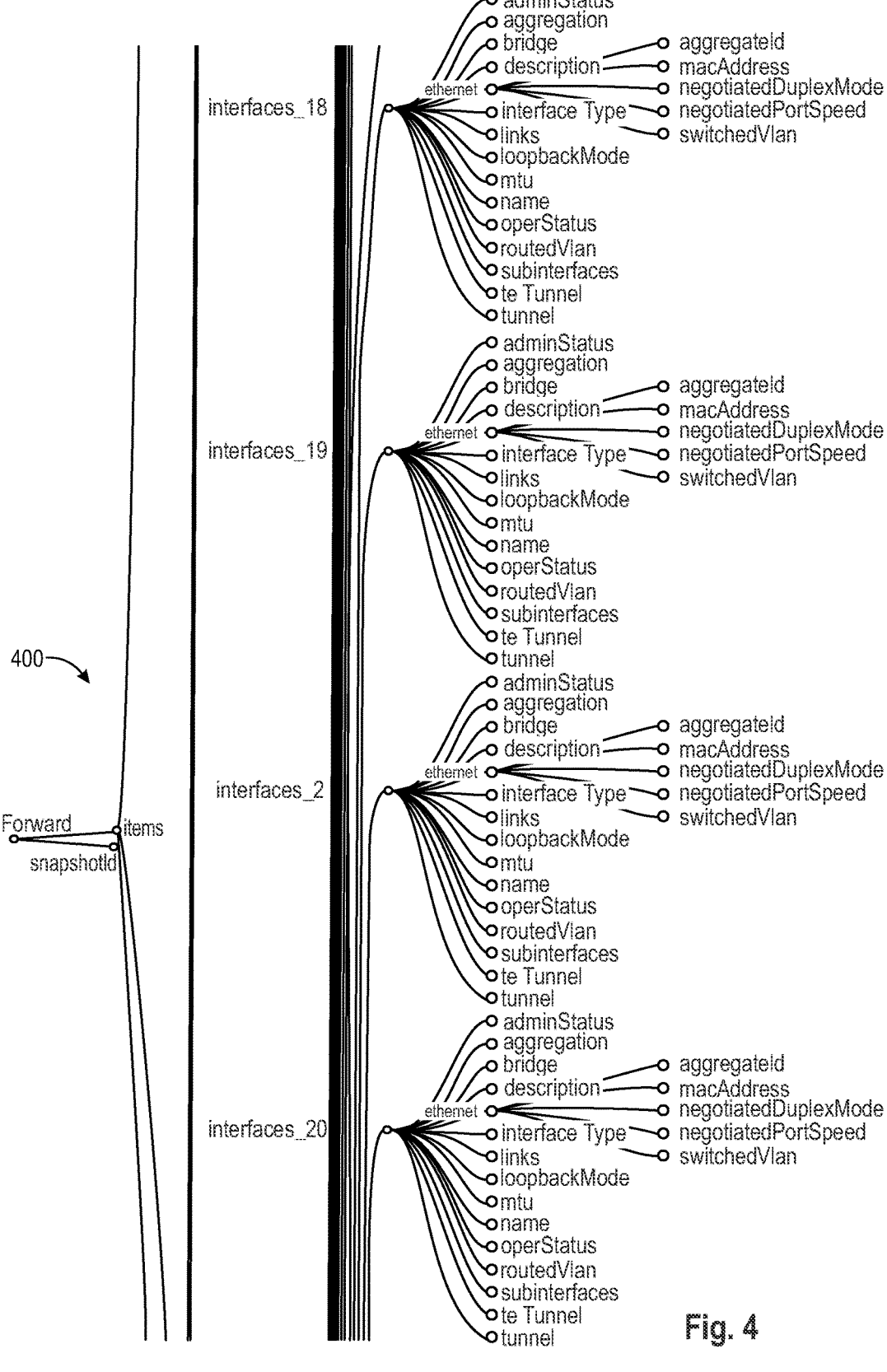
FIG. 4 is an example of a portion of a data tree.

FIG. 4 is an example of a portion of the data tree 400. The data tree 400 can correspond to the data tree 114, as shown in FIG. 1. Thus, reference can be made to the example of FIGS. 1-3 in the example of FIG. 4. The data tree 400 can utilize the relational information previously discussed to produce connections between data points and to interconnect the data tree 400. The tree structure the data tree 400 can enable manipulation of the network configuration data (e.g., the network configuration data 110, as shown in FIG. 1, or the network configuration data 300, as shown in FIG. 3) by a TB-CNN ML model (e.g., the ML model 128, as shown in FIG. 1, or the ML model 216, as shown in FIG. 2) while maintaining the relational information built into the portion of the data tree 400.

Tree-Based Convolutional Neural Network

Figure 5:
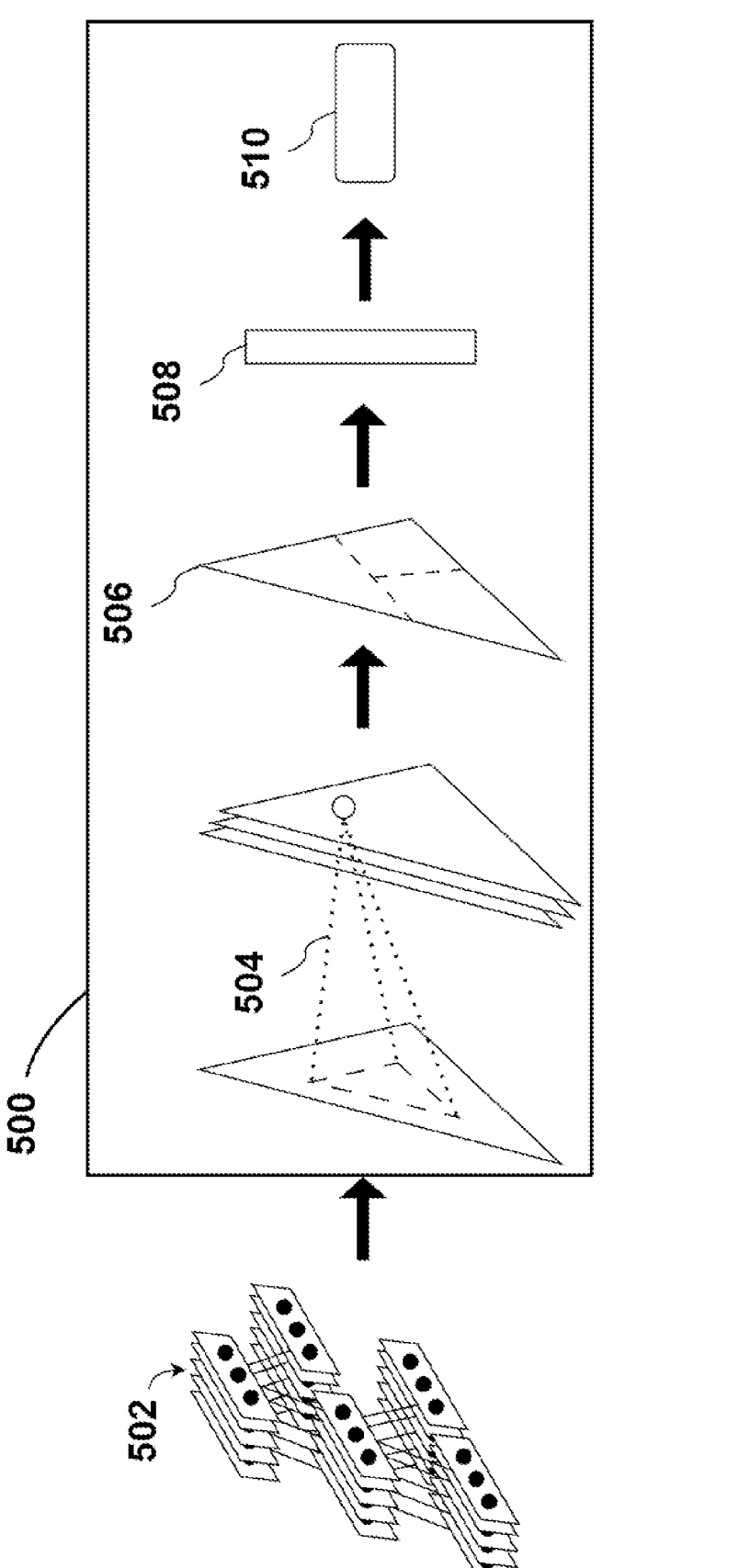
FIG. 5 is an example of a tree-based convolutional neural network (TB-CNN).

FIG. 5 is an example of a TB-CNN 500. In some examples, the TB-CNN 500 can be representative or correspond to the ML model 128, as shown in FIG. 1, or the ML model 216, as shown in FIG. 2. Thus, reference can be made to the example of FIGS. 1-4 in the example of FIG. 5. For clarity and brevity purposes, not all layers of the TB-CNN 500 have been shown in the example of FIG. 5. The TB-CNN 500 can receive a data set 502 which includes a plurality of data trees, or abstract syntax trees, which represent the input data in a tree format, such that the hierarchy of the data can be maintained through the branching nature of the data trees of the data set 502. In some examples, a data tree of the data set 502 corresponds to the data tree 114, as shown in FIG. 1.

The TB-CNN 500 can perform tree-based convolution at a tree-based convolution layer 504, such that the tree structure is maintained within the convolution. The TB-CNN 500 can map feature vectors to each layer of the tree-based convolution layer 504 without altering the structure of the data, therefore maintaining the relationships and hierarchical nature of the data trees of the data set 502. The one or more generated convolutional layers, or trees, can then pool into a single tree using a dynamic pooling layer 506. The dynamic pooling layer 506 can utilize one-way pooling which extracts a maximum value in each dimension from the convolutional layers, or three-way pooling shown by the dashed features within 506 which pools in three parts of the triangular tree structure. Following dynamic pooling, a hidden layer 508 that can be fully connected can feed an output layer 510 of the TB-CNN for classification, or labeling, that is, whether a network system is anomalous or non-anomalous. The output layer 510 can also identify a remedial action or corrective plan for mitigating or eliminating anomalous system behaviors in a network system (e.g., the network system 104, as shown in FIG. 1, or the network system 204, as shown in FIG. 2) that have been classified as exhibiting such a behavior. The TB-CNN 500 thus maintains the structure of the data trees of the data set 502 throughout the convolutional process, enables back-propagation as an effective training method, and can be employed on any hierarchical data set which can be formed into a data tree structure.

Method

Figure 6:
FIG. 6 is an example of a method for training a machine-learning (ML) model, for example, a TB-CNN.
Figure 7:
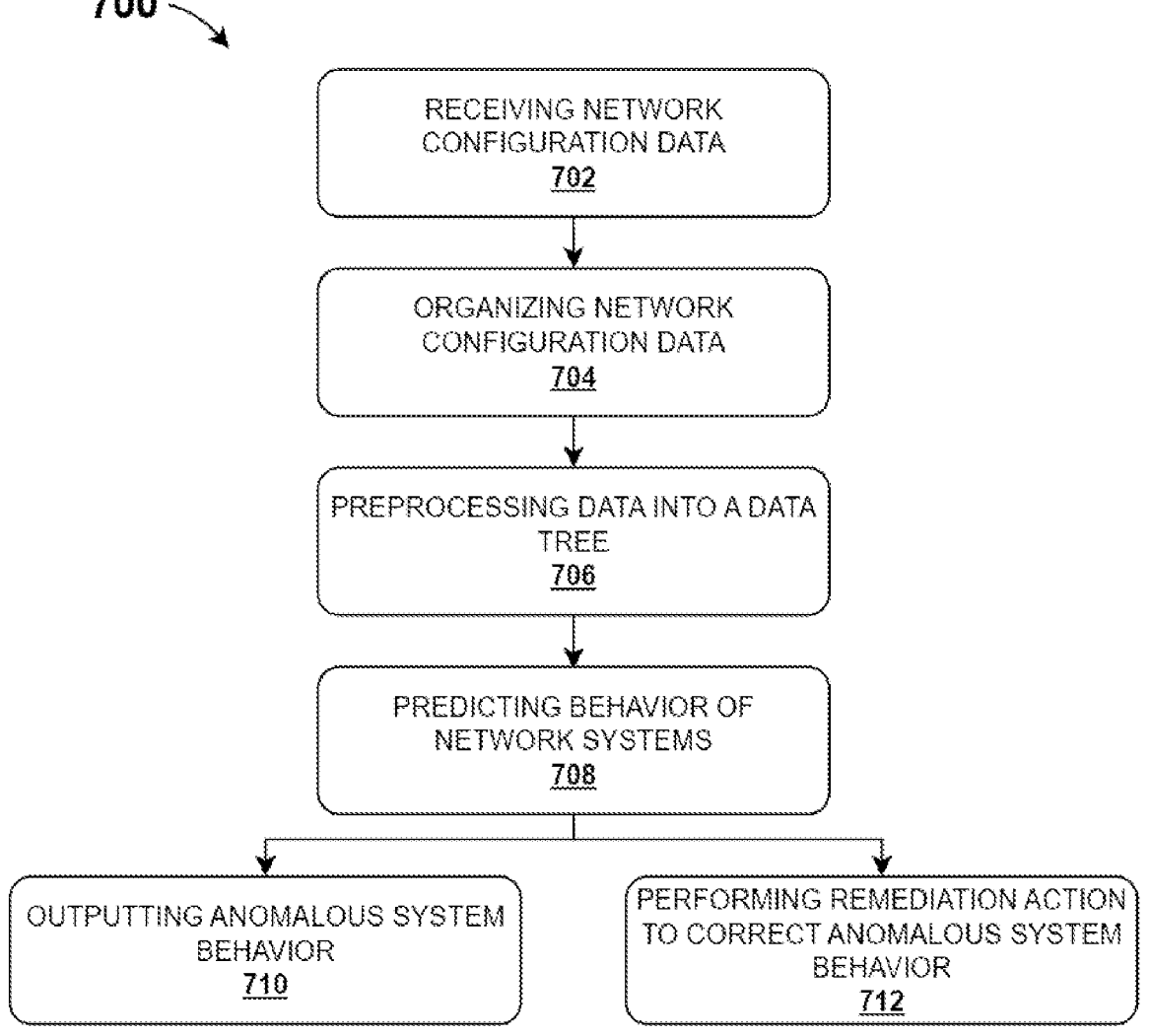
FIG. 7 is an example of a method for predicting and correcting anomalous system behaviors.

In view of the foregoing structural and functional features described above, example methods will be better appreciated with reference to FIGS. 6-7. While, for purposes of simplicity of explanation, the example methods of FIGS. 6-7 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods.

FIG. 6 is an example of a method 600 for training a ML model (e.g., the ML model 128, as shown in FIG. 1, or the ML model 216, as shown in FIG. 2) for anomalous system behavior detection and mitigation. In some examples, the method 600 can be at least partially implemented by the anomaly trainer tool 118, as shown in FIG. 1, or by the device 200, as shown in FIG. 2. Thus, reference can be made to the examples of FIGS. 1-5 in the example of FIG. 6.

The method 600 can begin at 602 by receiving network configuration training data sets (e.g., the network configuration data 110, as shown in FIG. 1, or the network configuration data 300, as shown in FIG. 3), for example, during a training phase of the ML model. For example, the network configuration data sets can include a network snapshot that includes configuration and state data, that can represent functional control (configuration) and active status (state) data of each network system (e.g., the network systems 104, as shown in FIG. 1, or the network systems 204, as shown in FIG. 2) of a network (e.g., the networks 102, as shown in FIG. 1, or the network 202, as shown in FIG. 2) over a period of time. In some examples, at 602, the configuration and state data can be queried from one or more network managers (e.g., the network manager 108, as shown in FIG. 1, or the network manager 210, as shown in FIG. 2), or can be provided as an input from external systems/devices.

At 604, the network configuration data sets can be organized (e.g., by the data organizer 112, as shown in FIG. 1, or the data preprocessor 120, as shown in FIG. 1, or the dataset generator 214, as shown in FIG. 2) into a data set of data trees (e.g., the data tree 114, as shown in FIG. 1). At 606, the dataset of data trees can be preprocessed (e.g., using the data preprocessor 120, as shown in FIG. 1) for ML model training. In some examples, steps 604 and 606 can be performed by a respective data preprocessor (e.g. the data preprocessor 120, as shown in FIG. 1). At 608, known anomalous system behaviors and remedial actions (e.g., the anomalous system behaviors and remedial actions 116, as shown in FIG. 1) can be received for each network configuration data set. At 610, a ML model, for example, a TB-CNN, can be trained based on the data trees and the anomalous system behaviors and remedial actions to provide a trained ML model. The trained ML model can be deployed on a communication network (e.g., the communication network 102, as shown in FIG. 1) as a part of an anomaly prediction tool (e.g., the anomaly prediction tool 124, as shown in FIG. 1) to monitor the network for anomalous activities and mitigate such activities.

FIG. 7 is an example of a method 700 for predicting and correcting anomalous system behaviors using a trained ML model, for example, a TB-CNN. In some examples, the method 700 can be at least partially implemented by the anomaly prediction tool 124, as shown in FIG. 1, or the device 200, as shown in FIG. 2. In some examples, the training of the ML model according to the method 600 can be incorporated into the method 700. Thus, reference can be made to the examples of FIGS. 1-6 in the discussion of FIG. 7.

The method 700 can begin at 702 by receiving network configuration data (e.g., the network configuration data 110, as shown in FIG. 1). During operation of a network (e.g., the network 102, as shown in FIG. 1, or the network 202, as shown in FIG. 2), the network configuration data can be queried or retrieved from a network manager (e.g., the network manager 108 as shown in FIG. 1, or the network manager 210, as shown in FIG. 2), or can be provided as an input from an external system/device. At 704, the network configuration data can be organized (e.g., by the data organizer 112, as shown in FIG. 1, or the data preprocessor 126, as shown in FIG. 1, or the dataset generator 214 as shown in FIG. 2), into a JSON file for further use. At 706, the JSON file can be preprocessed into a data tree (e.g., the data tree 114, as shown in FIG. 1) for use by the ML model (e.g., using the data preprocessor 126, as shown in FIG. 1). In some examples, steps 704 and 706 can be performed by a respective data preprocessor (e.g. the data preprocessor 126, as shown in FIG. 1).

At 708, an anomalous behavior of one or more network systems (e.g., the network systems 104, as shown in FIG. 1, or the network systems 204, as shown in FIG. 2) can be predicted (e.g., by the anomaly prediction tool 124, as shown in FIG. 1). For example, at 708, a trained ML model (e.g., the TB-CNN), such as provided according to the method 600, can be used to determine or identify the one or more network systems that are exhibiting an anomalous behavior condition. In some examples, at 708, the anomaly prediction tool can identify one or more remedial actions that can be taken to mitigate or eliminate undesired behavior condition that have been predicted for the one or more network systems.

At 710, an anomalous system behavior can be outputted (e.g., by the anomaly prediction tool 124). In some examples, at 710, the anomalous system behavior and identified network systems can be rendered on a display (e.g., as described herein). In some instances, the anomalous system behavior can include possible remediation action for mitigating or eliminating each anomalous system behavior. In some examples, at 712, the method 700 can include causing a (e.g., by the anomaly prediction tool 124) remedial action, as identified in the anomalous system behavior, to be taken to mitigate or eliminate identified anomalous system behavior. For example, the remedial action can be taken by a network manager (e.g., the network manager 108, as shown in FIG. 1) in response to the anomaly prediction tool 124.

Further Computer-Implemented Embodiments and Example Implementations

Various embodiments (including system 100 and its components (including tools 118 and 124, as shown in FIG. 1) and device 200, as shown in FIG. 2, can be implemented on one or more computing devices. The computing devices may be at the same or different locations. A computing device can be any type of device having one or more processors and memory. For example, a computing device can be a workstation, mobile device (e.g., a mobile phone, personal digital assistant, tablet or laptop), computer, server, computer cluster, server farm, game console, set-top box, kiosk, embedded system, or other device having at least one processor and computer-readable memory. In addition to at least one processor and memory, such a computing device may include software, firmware, hardware, or a combination thereof. Software may include one or more applications and an operating system. Hardware can include, but is not limited to, a processor, memory and user interface display or other input/output device.

In view of the foregoing structural and functional description, those skilled in the art will appreciate that portions of the embodiments can be embodied as a method, data processing system, or computer program product. Accordingly, these portions of the present embodiments can take the form of an entirely hardware embodiment, an entirely software embodiment, or an embodiment combining software and hardware, such as shown and described with respect to the computer system of FIG. 8. Furthermore, portions of the embodiments can be a computer program product on a computer-usable storage medium having computer readable program code on the medium. Any non-transitory, tangible storage media possessing structure can be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signal per se).

As an example and not by way of limitation, a computer-readable storage media can include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium can be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions can be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions can also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 8:
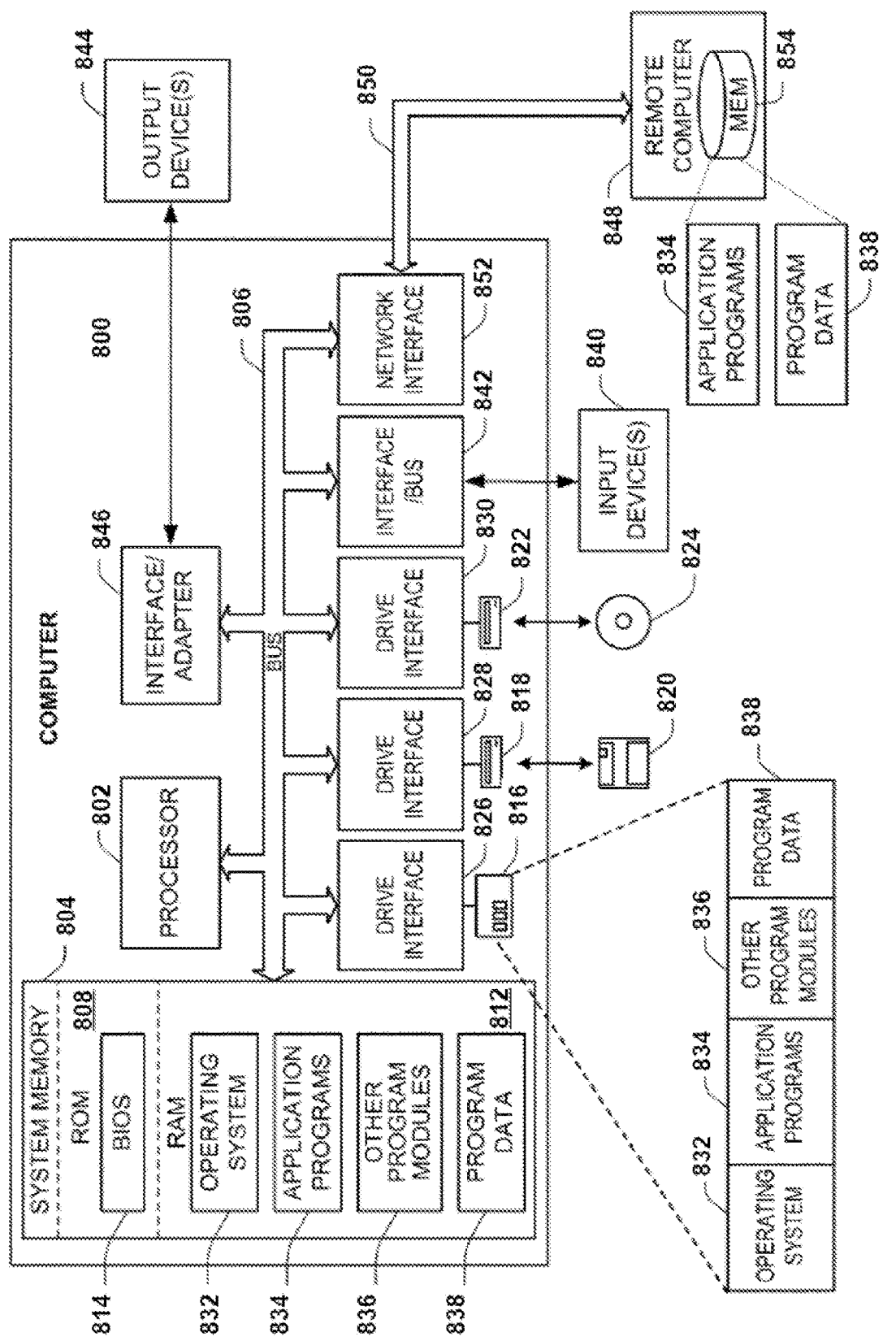
FIG. 8 is an example computing environment that can be used to perform methods according to an aspect of the present disclosure.

In this regard, FIG. 8 illustrates one example of a computer system 800 that can be employed to execute one or more embodiments of the present disclosure. Computer system 800 can be implemented on one or more general purpose networked computer systems, embedded computer systems, routers, switches, server devices, client devices, various intermediate devices/nodes or standalone computer systems. Additionally, computer system 800 can be implemented on various mobile clients such as, for example, a personal digital assistant (PDA), laptop computer, pager, and the like, provided it includes sufficient processing capabilities.

Computer system 800 includes processing unit 802, system memory 804, and system bus 806 that couples various system components, including the system memory 804, to processing unit 802. Dual microprocessors and other multi-processor architectures also can be used as processing unit 802. System bus 806 can be any of several types of bus structure including a memory bus or memory controller, a peripheral bus, and a local bus using any of a variety of bus architectures. System memory 804 includes read only memory (ROM) 810 and random access memory (RAM) 812. A basic input/output system (BIOS) 814 can reside in ROM 810 containing the basic routines that help to transfer information among elements within computer system 800.

Computer system 800 can include a hard disk drive 816, magnetic disk drive 818, e.g., to read from or write to removable disk 820, and an optical disk drive 822, e.g., for reading CD-ROM disk 824 or to read from or write to other optical media. Hard disk drive 816, magnetic disk drive 818, and optical disk drive 822 are connected to system bus 806 by a hard disk drive interface 826, a magnetic disk drive interface 828, and an optical drive interface 830, respectively. The drives and associated computer-readable media provide nonvolatile storage of data, data structures, and computer-executable instructions for computer system 800. Although the description of computer-readable media above refers to a hard disk, a removable magnetic disk and a CD, other types of media that are readable by a computer, such as magnetic cassettes, flash memory cards, digital video disks and the like, in a variety of forms, can also be used in the operating environment; further, any such media can contain computer-executable instructions for implementing one or more parts of embodiments shown and described herein.

A number of program modules can be stored in drives and ROM 810, including operating system 832, one or more application programs 834, other program modules 836, and program data 838. In some examples, the application programs 834 can include the anomaly trainer tool 118, the anomaly prediction tool 124, and respective modules, such as described herein. The application programs 834 and program data 838 can include functions and methods programmed for anomalous system behavior prediction and remediation, as well as for training and validating a TB-CNN ML model, as described herein.

A user can enter commands and information into computer system 800 through one or more input devices 840, such as a pointing device (e.g., a mouse, touch screen), keyboard, microphone, joystick, game pad, scanner, and the like. These and other input devices are often connected to processing unit 802 through a corresponding port interface 842 that is coupled to the system bus, but can be connected by other interfaces, such as a parallel port, serial port, or universal serial bus (USB). One or more output devices 844 (e.g., display, a monitor, printer, projector, or other type of displaying device) is also connected to system bus 806 via interface 846, such as a video adapter.

Computer system 800 can operate in a networked environment using logical connections to one or more remote computers, such as remote computer 848. Remote computer 848 can be a workstation, computer system, router, peer device, or other common network node, and typically includes many or all the elements described relative to computer system 800. The logical connections, schematically indicated at 850, can include a local area network (LAN) and a wide area network (WAN). When used in a LAN networking environment, computer system 800 can be connected to the local network through a network interface or adapter 852. When used in a WAN networking environment, computer system 800 can include a modem, or can be connected to a communications server on the LAN. The modem, which can be internal or external, can be connected to system bus 806 via an appropriate port interface. In a networked environment, application programs 834 or program data 838 depicted relative to computer system 800, or portions thereof, can be stored in a remote memory storage device 854.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

As used herein, the term "or" is intended to be inclusive, rather than exclusive. Unless specified otherwise, "X employs A or B" is intended to mean any of the natural incisive permutations. That is, if X employs A; X employs B; or X employs both A and B, the "X employs A or B" is satisfied. As used herein, the terms "example" and/or "exemplary" are utilized to delineate one or more features as an example, instance, or illustration. The subject matter described herein is not limited by such examples. Additionally, any aspects, features, and/or designs described herein as an "example" or as "exemplary" are not necessarily intended to be construed as preferred or advantageous. Likewise, any aspects, features, and/or designs described herein as an "example" or as "exemplary" is not meant to preclude equivalent embodiments (e.g., features, structures, and/or methodologies) known to one of ordinary skill in the art.

Understanding that is not possible to describe each and every conceivable combination of the various features (e.g., components, products, and/or methods) described herein, one of ordinary skill in the art can recognize that many further combinations and permutations of the various embodiments described herein are possible and envisaged. Furthermore, as used herein, the terms "includes," "has," "possesses," and/or the like are intended to be inclusive in a manner similar to the term "comprising" as interpreted when employed as a transitional word in a claim.

What have been described above are examples. It is, of course, not possible to describe every conceivable combination of components or methods, but one of ordinary skill in the art will recognize that many further combinations and permutations are possible. Accordingly, the present disclosure is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means "based at least in part on."

What is claimed is:

1. A computer-implemented method comprising:
   receiving network configuration data for each system on a network;
   assembling a data tree based on the network configuration data for the network;
   predicting, using a machine learning (ML) model, anomalous behavior associated with a cyber security threat within the network based on the data tree, wherein the ML model is a tree-based convolutional neural network (TB-CNN);
   displaying a list of anomalous systems within the network for remediation based on a prediction of the ML model; and
   causing one or more remedial actions to be performed on at least one anomalous system in the list of anomalous systems, wherein the ML model includes a tree-based convolution layer that maintains a structure of the set of data trees and relationships between nodes of the data trees.

2. The computer-implemented method of claim 1, further comprising:
   receiving further network configuration data for each system on a network;
   receiving a label of the one or more remedial actions performed;
   determining a new behavior of each anomalous system in the list of anomalous systems; and
   reinforcing or modifying a determination of one or more remedial actions from a success or failure of the one or more remedial actions performed.

3. The computer-implemented method of claim 1, further comprising:
   receiving historical network configuration data for each system on the network;
   receiving a historical anomalous system list for the network;
   associate the anomalous behaviors with the corresponding data trees;

organize the dataset with the set of data trees and their anomalous behaviors; and training the ML model on the dataset of the historical network configuration data and the corresponding historical anomalous system list.

4. The computer-implemented method of claim 3, further comprising:

receiving one or more historical remedial actions taken to correct one or more anomalies of the anomalous system list; and training the ML model to predict one or more remedial actions for each anomalous system.

5. A system comprising:

a processor; and memory storing machine readable instructions executable by the processor, the machine readable instructions comprising:

an anomaly prediction tool comprising:

a machine learning (ML) model operable to:

detect anomalous network systems operating on a network based on a set of data trees derived from network configuration data for the network with different anomalous behaviors, wherein the ML model detects a given anomalous behavior associated with a cyber security threat of a given anomalous network system;

determine a given remedial action for correcting the given anomalous behavior; and provide the given remedial action to a network manager configured to implement the remedial action to correct the given anomalous behavior, wherein the ML model is a tree-based convolutional neural network (TB-CNN) that performs tree-based convolution at a tree-based convolution layer, such that a structure of the set of data trees is maintained within convolution.

6. The system of claim 5, wherein the network configuration data comprises state and configuration data for each network system operating on the network.

7. The system of claim 6, wherein the anomaly prediction tool comprises a data preprocessor to generate the set of data trees based on the network configuration data.

8. The system of claim 7, wherein the state and configuration data for each network system are sorted into an abstract syntax tree, wherein each node of the abstract syntax tree is an abstract component of the configuration data or state data.

9. The system of claim 6, wherein the machine readable instructions include a data organizer to generate the set of data trees based on the network configuration data.

10. The system of claim 6, wherein the machine readable instructions further comprise:

an anomaly trainer tool comprising:

a data preprocessor to format a set of training data trees and a set of verification data trees, where each data tree is derived from network configuration data for the network with its anomalous behavior; and a first tree-based convolutional neural network (TB-CNN) trainer to train the TB-CNN based on the set of training data trees and known anomalous system behaviors and remedial actions.

11. The system of claim 10, wherein the anomaly trainer tool assesses a success or failure of one or more remedial actions of the remedial actions performed, and wherein the anomaly trainer tool modifies an operation of the TB-CNN based upon the success or failure of the one or more remedial actions performed.

12. The system of claim 6, wherein the anomaly prediction tool generates a list of network systems, each network system with one detected anomalous behavior.

13. The system of claim 12, wherein the anomaly prediction tool generates instructions for correcting the one or more detected anomalous behaviors for each network system on the list of network systems.

14. The system of claim 5, wherein the given anomalous behavior represents failed reachability intent and the given remedial action includes at least repairing a configuration of the given network system.

15. A non-transitory computer-readable medium storing machine readable instructions, which when executed by a processor, cause the processor to:

receive network configuration data for each system on a communication network;

generate a data tree based on the network configuration data of each system on the communication network;

organize a set of data trees and their anomalous behaviors into a dataset;

employ a data preprocessor to identify one or more anomalous behaviors associated with a cyber security threat by one or more systems on the communication network based on the data tree;

use a machine learning (ML) model to train using the dataset;

feed a new data tree from the network configuration data from the network system into the trained ML model to predict the anomalous behavior;

output data indicating which systems of the one or more systems are exhibiting anomalous system behaviors; and cause one or more remedial actions to be implemented with respect to one or more anomalous systems to mitigate, wherein the ML model is a tree-based convolutional neural network (TB-CNN) that performs tree-based convolution at a tree-based convolution layer, such that a structure of the set of data trees is maintained within convolution.

16. The non-transitory computer-readable medium of claim 15, further comprising querying a network manager to obtain the network configuration data.

17. The non-transitory computer-readable medium of claim 16, wherein the network manager utilizes intent-based networking (IBN) software to obtain the network configuration data of each system on the communication network and the anomalous behavior.

* * * * *